United States Patent [19]

Roseen

[11] 4,289,112

[45] Sep. 15, 1981

[54] HEAT STORING SOLAR COLLECTOR DEVICE

[75] Inventor: Rutger A. Roseen, Nyköping, Sweden

[73] Assignee: Studsvik Energiteknik AB, Nyköping, Sweden

[21] Appl. No.: 951,334

[22] Filed: Oct. 16, 1978

[30] Foreign Application Priority Data

Nov. 1, 1977 [SE] Sweden .............................. 7712327

[51] Int. Cl.³ .............................................. F24J 3/02
[52] U.S. Cl. ................................... 126/415; 126/438; 126/440
[58] Field of Search .............. 126/415, 416, 438, 439, 126/440; 4/172.2, 172.10, 172.14

[56] References Cited

U.S. PATENT DOCUMENTS

| | | | |
|---|---|---|---|
| 1,969,839 | 8/1934 | Goddard | 126/440 |
| 3,915,148 | 10/1975 | Fletcher | 126/440 |
| 3,982,527 | 9/1976 | Cheng et al. | 126/438 |
| 3,988,166 | 10/1976 | Beam | 126/439 |
| 4,134,393 | 1/1979 | Stark et al. | 126/440 |
| 4,146,015 | 3/1979 | Acker | 126/415 |
| 4,148,301 | 4/1979 | Cluff | 126/438 |
| 4,188,941 | 2/1980 | Hopkins | 126/440 |

FOREIGN PATENT DOCUMENTS

| | | | |
|---|---|---|---|
| 148278 | 9/1952 | Australia | 126/438 |
| 994106 | 11/1951 | France | 126/415 |
| 2315067 | 1/1977 | France | 126/415 |
| 251334 | 9/1948 | Switzerland | 126/440 |
| 146820 | 5/1921 | United Kingdom | 126/440 |

*Primary Examiner*—James C. Yeung
*Attorney, Agent, or Firm*—Christie, Parker & Hale

[57] ABSTRACT

A solar collector device is placed on a floating insulating lid of a rreservoir containing a heat storing liquid. The solar collector device comprises lens means which concentrate incident solar radiation to focal points or focal lines rear or at the lid, and the lid has apertures through which the focus portions of the radiation beams pass with snug clearance. Transparent evaporation preventing diaphragms seal the appertures. Electricity generating semi-transparent solar cells may be arranged in the apertures, whereby incident solar radiation partly produces electricity, partly heats the liquid, and whereby the liquid cools the cells. In the case the lens means comprise axially elongated lenses in parallel with the lid and the apertures are slots, aligned with the lens axes, the lid is rotatable whereby to maintain the lens axes, the slots and the sun radiation in one and the same plane during day time.

19 Claims, 8 Drawing Figures

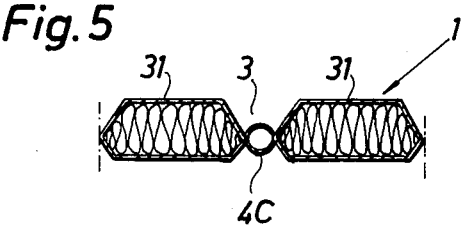
Fig. 5
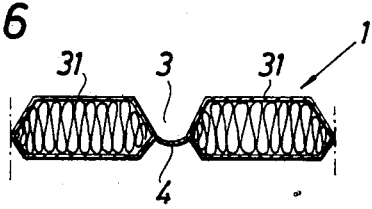
Fig. 6
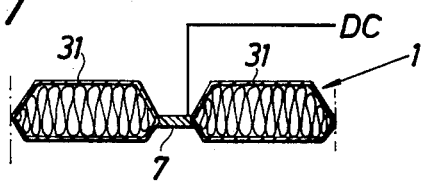
Fig. 7
Fig. 8
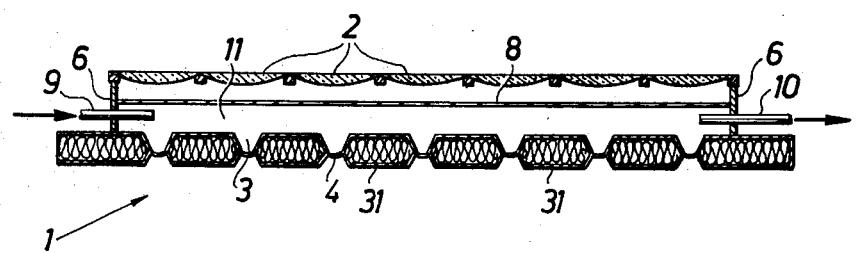

HEAT STORING SOLAR COLLECTOR DEVICE

BACKGROUND OF THE INVENTION

The present invention refers to a heat storing solar collector device comprising a liquid reservoir with an insulating lid floating on the liquid surface, solar collector means being arranged above the lid for heating of the liquid in the reservoir.

Solar collector devices of the type indicated above are previously known, at which the solar collector means consist of lenses or reflectors which concentrate the incident solar energy onto heat absorption tubes through which a liquid flows. At such known devices circulation systems for transport of the liquid through the absorption tubes are required and moreover, it is normally required that the heat absorption tubes are designed in specific ways in order to take care of the incident solar energy to the maximum extent. Despite advanced designs of the absorption tubes the devices exhibit relatively low efficiency, partly because the lens means and the reflectors respectively cannot even approximately be made optically perfect, which brings about that portions of the concentrated radiation energy beams fall outside the absorption tubes, partly due to the shallow energy absorption depth of the absorption tubes; a relatively large energy absorption depth would be desirable in the light of the wide frequency spectrum of the incident solar energy.

An object of the present invention is therefore to devise a solar collector device of the preamblewise mentioned type, at which said draw-backs are avoided.

Other objects and advantages with the invention will appear in the following.

SUMMARY OF THE INVENTION

According to the invention there is provided a heat storing solar collector device of the preamblewise mentioned type, which substantially is characterized in that apertures are arranged in the lid and in that the solar collector means are arranged to gather radiation energy incident against the device to concentrated radiation energy beams, which fall through the apertures such that the radiation energy is absorbed directly in the liquid mass of the reservoir.

The surface area of the apertures merely constitute a fraction of the surface area of the lens means.

In a preferred embodiment of the invention, the apertures consist of narrow elongated parallel slots in the lid, the solar collector means being arranged to gather incident radiation energy to narrow elongated radiation energy beams which fall through the slots.

The width of the slots and the dimensions of the apertures respectively, are adapted to the refraction capability and focal distance of the lens means such that the slots and the apertures respectively just can let through the entire radiation energy beams. Preferably the lens means are arranged in such a way that their focal points or the similar lie at the smallest dimension of the slot and the apertures respectively.

The solar collector means may consist of axial symmetric lenses which are arranged above and in parallel with the lid, and the lenses may then be designed as Fresnel-lenses, preferably of a plastic material such as poly(methyl methacrylate). The lenses may then be located closely adjacent each other so that they together form a transparent covering surface above the lid, whereby the lenses may be utilized as a convection protection.

Alternatively, the solar collector means may consist of mirroring surfaces having a shape substantially corresponding to axial symmetric parabolic reflectors each having a central aperture at a slot in the lid, the "focal point" of each reflector suitably being located at the narrowest portion of the slot. The solar collector means, whatever way they are designed, are perferably arranged adjacent each other in order to receive incident solar radiation energy over substantially the entire surface area of the lid over which the solar collector means are arranged. The slots and the apertures respectively may be entirely free such that the liquid is exposed in the slots, but preferably the slots are at their lower portions screened off by means of one or more radiation energy permeable sealing diaphragms. A tube may be arranged in each slot to the formation of two diaphragms therein, said tube preferably being evacuated.

The lid may comprise parallel blocks or rods which are arranged maintainable at predetermined mutual distances in the horizontal direction in order to form said slots. The rods may then also be adapted to be gathered and possibly also completed with one or more further rods, whereby the insulation capability of the lid may be enhanced during night time for example, elimination of the slots.

Further the space between the lid and the lenses may be screened off, and means may be arranged for introduction and removal of an insulation material in the shape of a powder or foam, for example, in said space. In the case of lenses it is also possible to arrange a separate transparent convection guard in the area between the lenses and the lid, and means may be arranged for introduction and removal of insulation material in the space between the convection guard and the lid and the liquid surface or diaphragms arranged in the slots. By virtue of the advantageous design of the inventive device it is favorable to arrange electricity generating energy cells, so called solar cells, in connection with the apertures in the lid, said energy cells being arranged to transmit unused radiation energy to the liquid mass. Further the liquid of the reservoir may consist of water having such a salt concentration, that the hottest liquid is gathered in the bottom layer of the reservoir. The lid and the solar collector means are suitably arranged rotatable such that the solar collector means thereby can be maintained aligned with the sun and such that the concentrated energy beams leaving the solar collectors are maintained aligned with the apertures in the lid.

The invention is defined in the appended claims.

BRIEF DESCRIPTION OF THE DRAWINGS

FIG. 5 is an exploded view of an alternate embodiment of the aperture of FIG. 3;

FIG. 6 is an exploded view of an alternate embodiment of the aperture of FIG. 3;

FIG. 7 is a front elevation view of a solar cell arranged in an aperture in the lid of FIG. 1; and FIG. 8 is a schematic front elevation sectional view of means for introduction and removal of an insulation material in the space above the lid.

DETAILED DESCRIPTION

Figure 1:
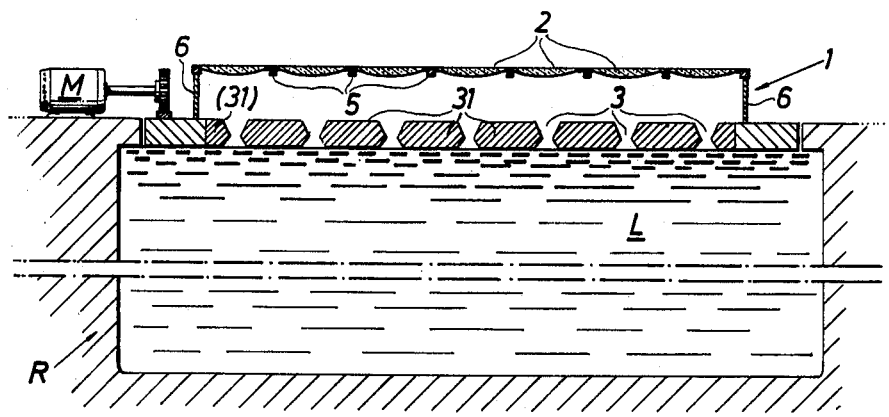
FIG. 1 is a schematic front elevation cross sectional view of a heat storing solar collector device according to the invention.

FIG. 1 shows a liquid reservoir R which contains liquid L on the surface of which a lid 1 floats. The lid 1 which comprises an insulating material, is arranged rotatable by means of a drive motor M. The lid has a plurality of apertures 3. A lens 2 is arranged above each aperture 3, said lens being arranged to gather incident solar radiation to a narrow energy beam which falls through respective aperture 3 in the lid 1. The lenses 2 are supported from the lid by means of a support means 5 and are arranged adjacent each other, such that they together form a convection barrier. The space between the lenses 2 and the lid 1 is screened off by means of side panels 6.

Figure 2:
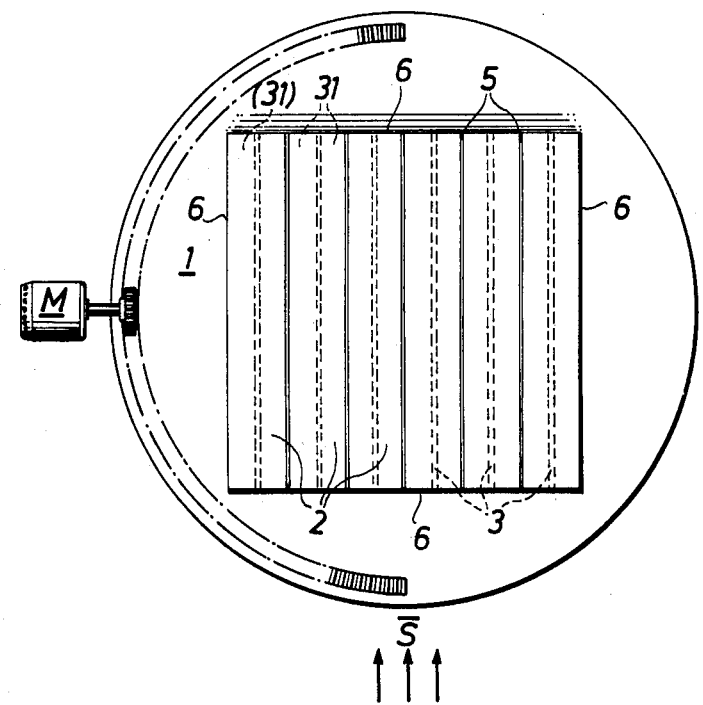
FIG. 2 is a top plan view of the device of FIG. 1.

FIG. 2 shows a horizontal view of the device according to FIG. 1, and is intended to illustrate that the motor M is arranged to rotate the lid 1 such that the longitudinal axes of the lenses 2 are maintained in parallel with vertical planes through the direction of the incident solar radiation S. FIG. 2 illustrates also that the lenses 2 are axial symmetric and elongated and that the slots 3 in the lid 1 are narrow centered elongated and centred against the lenses 2.

Figure 3:
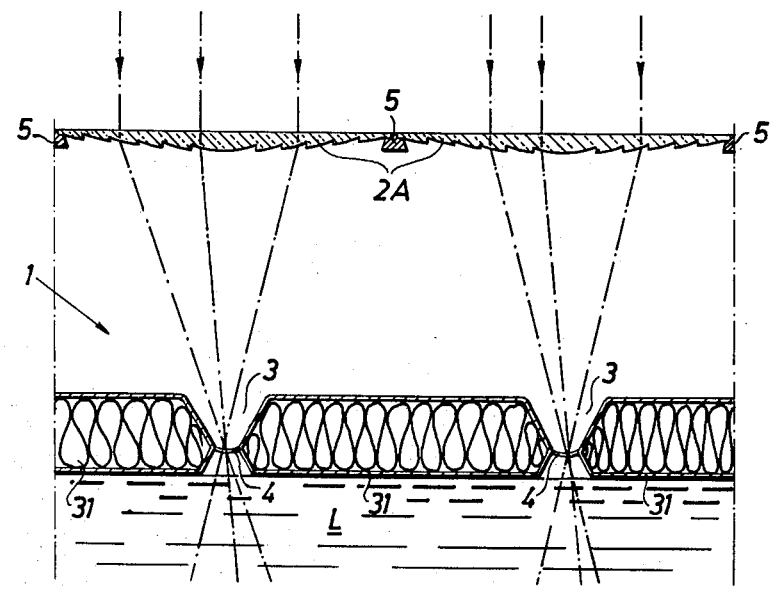
FIG. 3 is an exploded view of two lenses and apertures of the device of FIG. 1.

FIG. 3 illustrates a detail of a device according to FIG. 1, wherein the lenses 2a are shown designed as Fresnel-lenses, preferably of plastic. Such lenses may simply be manufactured for example by an extrusion process or by axial profile machining of a plate shaped material. Moreover, it is appreciated that axial symmetric lenses of the type illustrated in FIGS. 1 and 2 also may be located closely adjacent each other such that they also serve as a convection barrier. The apertures 3 in the lid may be chamferred in the illustrated way in order to permit the gathered radiation beams to snugly but freely pass the aperture, and moreover one or more diaphragms 4 are preferably arranged in each aperture 3 in order to prevent evaporation of liquid therethrough. The lenses 2 are designed and located such that their focal points lie in the area of the narrowest portion of the aperture 3, but it should be clear that it is also possible to design the apparatus in such a way that the focal point will lie a small distance below the diaphragm 4 or a small distance above the diaphragm 4.

Figure 4:
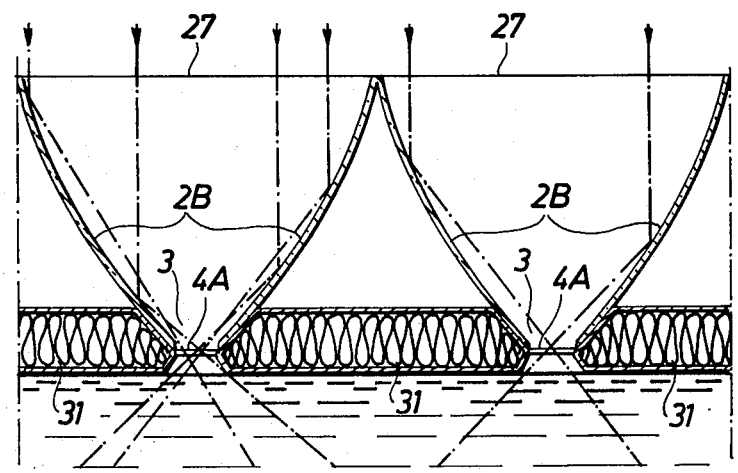
FIG. 4 is a front elevation view of an alternative embodiment of a solar collector means of FIG. 1.

FIG. 4 shows an alternative to the arrangement according to FIG. 3, wherein the solar energy collecting means consist of reflector pairs 2b which deflect the incident solar radiation to a "focal point", which lies in or near the narrowest portion of the aperture 3. Also in this case a diaphragm pair 4 may be arranged in the narrowest portion of the slot in order to avoid an evaporation of liquid therethrough. However, it should be appreciated that in this embodiment it could be useful not to have any diaphragms 4,4a in the apperture 3 as thereby precipitation may be drained directly down into the liquid mass L of the reservoir R. Also in this case it is possible to locate adjacent reflector pairs 2b close to each other such that a maximum portion of incident solar radiation can be taken care of. However, it is preferred to arrange at least one diaphragm at the lower portion of each reflector pair and furthermore to arrange transparent plates 27 (convection barriers) on top of the reflector pairs 2a,2b. Moreover, it is preferred to make the reflector pairs with axial symmetric design and to arrange them close to each other as is shown in FIG. 4.

FIG. 5 shows schematically a portion of the lid 1, a diaphragm 4c being arranged in the apperture 3. The diaphragm 4c is formed of a transparent tube which preferably is evacuated. The tube 4c offers, due to the curvature of the tube wall, minimum reflection losses, and offers also a high transmission due to the evacuation.

FIG. 6 shows an alternative diaphragm 4 for the apperture 3. In FIG. 6 the diaphragm is precurved and made of a resilient material such that the insulation of the lid may be enhanced during night time for example, by bringing the rods or blocks 31 defining the apertures 3 closer to each other. Then the diaphragm 4 will be bent in a predetermined way such that the blocks 31 can be brought into engagement with each other.

Due to the principle operation of the inventive device, the device is especially well suited to be combined with so called solar cells. Such solar cells may be positioned in or at the apertures 3 and may then be arranged above, below or between diaphragms in the appertures 3 and be arranged to transmit to the liquid mass L the radiation energy, which is not taken care of by the solar cell for electricity generation DC. Furthermore, it is apperciated that the solar cells 7 to the extent they are transparent, can serve as diaphragms themselves.

FIG. 8 shows a device of the design principle revealed in FIGS. 1 and 2, wherein an inlet means 9 and an outlet means 10 are arranged to introduce and remove respectively an insulation material such as a pulverous insulation material or a foam material into and from respectively the space present between the lenses 2, the lid 1 (and the liquid surface and the diaphragms in the apertures 3 of the lid respectively) and the panels 6. As indicated in FIG. 8 a separate convection guard 8 may be arranged in said space in order to better define the volume of the insulation material 11 and furthermore, offer an enhanced convection protection when the device is in operation. The means 9 and 10 may consist of feed tubes which are connected to fans or pumps.

In the drawings the lenses 2, 2a and the reflector pairs 2b have been illustrated as having an axial symmetric design and the apertures 3 have been shown as elongated slots which are centered or aligned therewith, but it should be appreciated that it is conceivable to rather let the device comprise rotational symmetric lenses or the like, in which case the apertures should have a shape of substantially round holes. In the last mentioned case it should also be appreciated that the lid not necessarily has to follow the wandering of the sun and therefore be rotatable; rather the aperture could be designed with an elongated arched shape corresponding to the wandering of the focal point during the day.

In the illustrated embodiment the focal point has been shown to lie in the narrowest portion of the aperture 3, but it is appreciated that it may be desirable to locate the focal point at a small depth in the liquid mass, for example at the level of the bottom surface of the lid 1, partly in order to reduce heating of the diaphragms 4 as far as possible and, partly in order to achieve a maximum temperature rise locally in the liquid mass. This aspect is then to be weighed against the higher heat losses which then occur when, due to the location of the focal point, the aperture 3 must be designed with a larger dimension.

Distinguished advantages with the device are that no heat absorption tubes or pump and control systems are necessary in order to transmit the gathered heat from the solar collectors to the reservoir and that, despite this, a good insulation over the water surface of the reservoir; as the lens means concentrate incident solar radiation to focal points or focal lines at the lid and as the lid has apertures through which the focused portions of the radiation beams pass with snug clearance, it is appreciated that the apertures will occupy a negligible portion of the surface area of the lid, and furthermore the apertures may be covered with evaporation preventing radiation transparent diaphragms.

Morever semi-transparent solar cells arranged in the lid apertures will partly produce electricity, partly transmit surplus energy to the liquid mass and, partly be cooled by the liquid whereby the electricity generation efficiency is enhanced.

The liquid L may be water having such a salt concentration that the hottest liquid is gathered in the bottom layer of the reservoir. This would in turn imply a better cooling of the solar cells and reduce heat losses via the insulating lid.

Should the device be used merely for storage of heat (no solar cells used) it is evident that the inventive device offers a very high heat absorption (efficiency) in comparision with conventional systems as the transmission of solar radiation energy to the liquid mass is direct and as the energy absorption depth of a liquid mass is much deeper than in the heat absorption tubes of the prior art.

What is claimed is:

1. In a heat storing solar collector device comprising a liquid reservoir (R), an insulating lid (1) floating on the surface of the liquid (L), and solar collector means (2) over the lid, adapted to heat the liquid (L) of the reservoir (R), wherein the improvement comprises a plurality of spaced apart apertures (3) located in the lid (1) and wherein said collector means includes a plurality of lenses for concentrating incident solar radiation energy into respective concentrated radiation energy beams, the solar collector means (2) being oriented so that the radiation energy beams pass through respective apertures, whereby radiation energy is absorbed directly in the liquid mass (L) of the reservoir to heat the liquid mass.

2. A device according to claim 1 wherein the apertures (3) consist of narrow parallel slots in the lid (1) and the solar collector means (2) are arranged to gather incident radiation energy to narrow elongated radiation energy beams which fall through the slots.

3. A device according to claim 2 wherein the solar collector means (2) consist of axial symmetric lenses (2,2a) which are arranged above and in parallel with the slots.

4. The device according to claim 3 wherein the Fresnel-lenses are formed of a plastic material such as poly (methyl methacrylate).

5. A device according to claim 3 wherein the lenses are Fresnel-lenses (2a).

6. A device according to claim 2 wherein the slots (3) at their lower portion are screened off by means of one or more radiation energy permeable sealing diaphragms (4).

7. A device according to claim 6 wherein a tube (4c) is arranged in each slot (3) to form two diaphragms therein.

8. A device according to claim 2 wherein the lid (1) comprises parallel blocks (31) arranged at predetermined distances relative to each other, for forming the slots (3).

9. A device according to claim 8 wherein the rods (31) are arranged to be brought into engagement with each other and be completed, whereby the insulation capacity of the lid (1) can be enhanced by elimination of the slots.

10. The device according to claim 2 wherein the lid comprises parallel rods arranged at predetermined distances relative to each other for forming the slots (3).

11. A device according to claim 1 wherein the solar collector means (2) consist of mirroring surfaces (2b).

12. A device according to claim 1 wherein the solar collector means (2) are arranged adjacent each other in order to cover substantially all of the lid surface over which the solar collector means are arranged.

13. A device according to claim 12 wherein means (9,10) are arranged for introduction and removal of an insulation material (11) in the space between the solar collector means (2) and the lid (1).

14. A device according to claim 1 wherein a transparent convection protection (8) is arranged in the area between the solar collector means (2) and the lid (1), and in that means (9,10) are arranged for introduction and removal of insulation material (11) in the space between the convection protection (8) and the lid (1).

15. A device according to claim 1 wherein electricity generating energy cells (7) are arranged in connection to the apertures (3), the energy cells (7) being arranged to transmit non-transformed radiation energy to the liquid mass (L).

16. A device according to claim 1 wherein the liquid is water having such a salt concentration that the hottest liquid is gathered in the bottom layer of the reservoir (R).

17. A device according to claim 1 wherein the lid (1) is arranged rotatable (M) whereby the solar collector means (2) may be kept aligned with the solar direction (s).

18. A solar collector device for storing heat in a liquid reservoir comprising:
a heat insulating lid disposed over the liquid reservoir for inhibiting passage of heat radiation through the lid from the reservoir, the lid having a plurality of spaced apart apertures;
solar collector means disposed over the lid, said collector means including means for concentrating incident solar radiation into radiation energy beams passing through respective apertures in the lid and directly into the liquid for heating the liquid; and
floatation means for maintaining the lid afloat upon the surface of the liquid.

19. The device according to claim 18 wherein the floatation means and the collector means are attached to the lid and form an integral unit.

* * * * *

UNITED STATES PATENT AND TRADEMARK OFFICE
CERTIFICATE OF CORRECTION

PATENT NO. : 4,289,112
DATED : Sept. 15, 1981
INVENTOR(S) : Rutger A. Roseen

It is certified that error appears in the above—identified patent and that said Letters Patent is hereby corrected as shown below:

In the Abstract, line 2, "rreservoir" should be -- reservoir --;
column 2, line 27, insert -- by -- before "elimi-";
column 3, line 27, "centered" should be -- parallel --;
"centred" should be -- centered --

Signed and Sealed this

Nineteenth Day of January 1982

[SEAL]

Attest:

GERALD J. MOSSINGHOFF

Attesting Officer

Commissioner of Patents and Trademarks